United States Patent [19]

Foster

[11] Patent Number: 5,000,647

[45] Date of Patent: Mar. 19, 1991

[54] RECIPROCATING FLOOR CONVEYOR HAVING SEPARABLE FLOOR UNIT AND DRIVE UNIT

[76] Inventor: Raymond K. Foster, P.O. Box 1, Madras, Oreg. 97741

[21] Appl. No.: 424,124

[22] Filed: Oct. 19, 1989

[51] Int. Cl.$^5$ ............................................. B60P 1/00
[52] U.S. Cl. .................................. 414/525.9; 198/750
[58] Field of Search ............... 198/750; 414/507, 523, 414/525.1, 525.9

[56] References Cited

U.S. PATENT DOCUMENTS

| | | | |
|---|---|---|---|
| 3,276,307 | 10/1966 | Williamson | 198/750 X |
| 4,144,963 | 3/1979 | Hallstrom | 198/750 |
| 4,580,678 | 4/1986 | Foster | 198/750 |

FOREIGN PATENT DOCUMENTS

| | | | |
|---|---|---|---|
| 3638580 | 5/1988 | Fed. Rep. of Germany | 198/750 |
| 36086 | 4/1978 | Japan | 198/750 |

Primary Examiner—H. Grant Skaggs
Assistant Examiner—Keith L. Dixon
Attorney, Agent, or Firm—Glenn D. Bellamy; Delbert J. Barnard

[57] ABSTRACT

Disclosed is a reciprocating floor conveyor having a separable floor unit and power drive unit (24). The floor unit includes a bottom frame (38, 40, 42, 44) and at least three sets of elongated reciprocatable floor members (26, 28, 30) which are supported on the bottom frame for independent longitudinal reciprocation in a single plane between start and advanced positions. A separate transverse drive beam (32, 34, 36) for each set of floor members (26, 28, 30) is connected to the underside of its respective set of floor members (26, 28, 30). The power drive unit includes a separate drive leg (54, 56, 58) for each set of floor members (26, 28, 30). Each drive leg is detachably connectable to a separate transverse drive beam (32, 34, 36) to reciprocatably drive it and its set of floor members (26, 28, 30). Each drive leg (54, 56, 58) is mounted to swing forwardly and rearwardly about a pivot point (60, 62, 64). A separate drive motor (66, 68, 70) for each drive leg (54, 56, 58) is operably connected (92, 94, 96) to swing the drive legs (54, 56, 58) to, in turn, move the drive beams (32, 34, 36) and the respective connected floor members (26, 28, 30) between start and advanced positions. The drive motors (66, 68, 70) operate in sequence to move a majority of the drive legs (54, 56, 58) together in one direction and then to return each drive leg (54, 56, 58) separately in the opposite direction. In this manner, the floor unit and power drive unit may be separated for independent transportation thereof and for interchange between other similar floor units and power drive units.

15 Claims, 7 Drawing Sheets

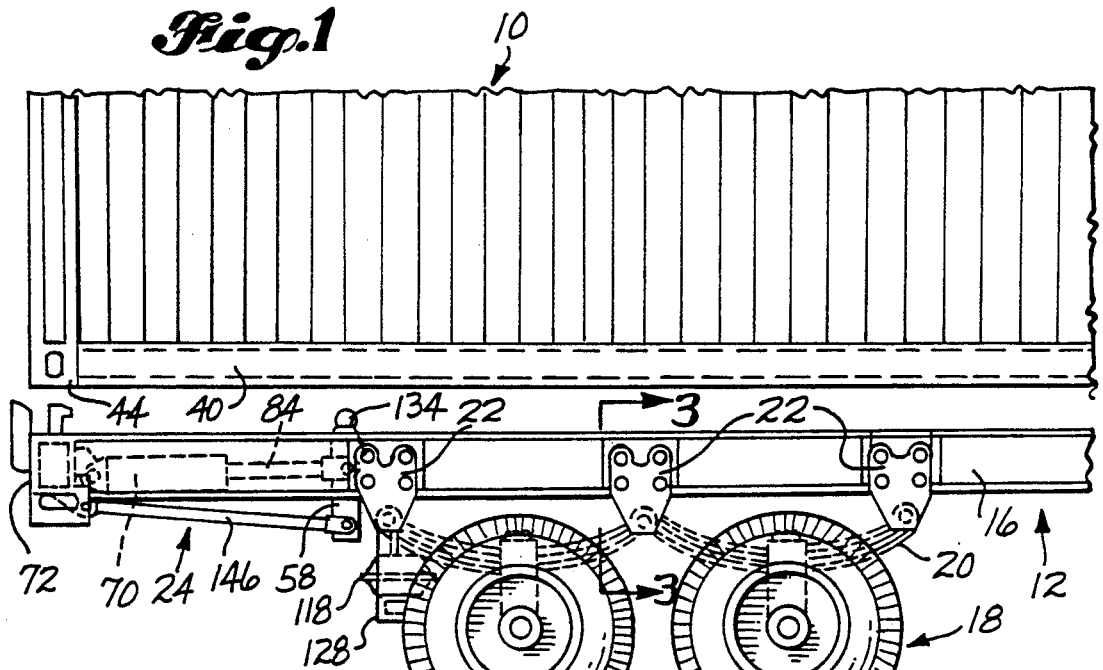
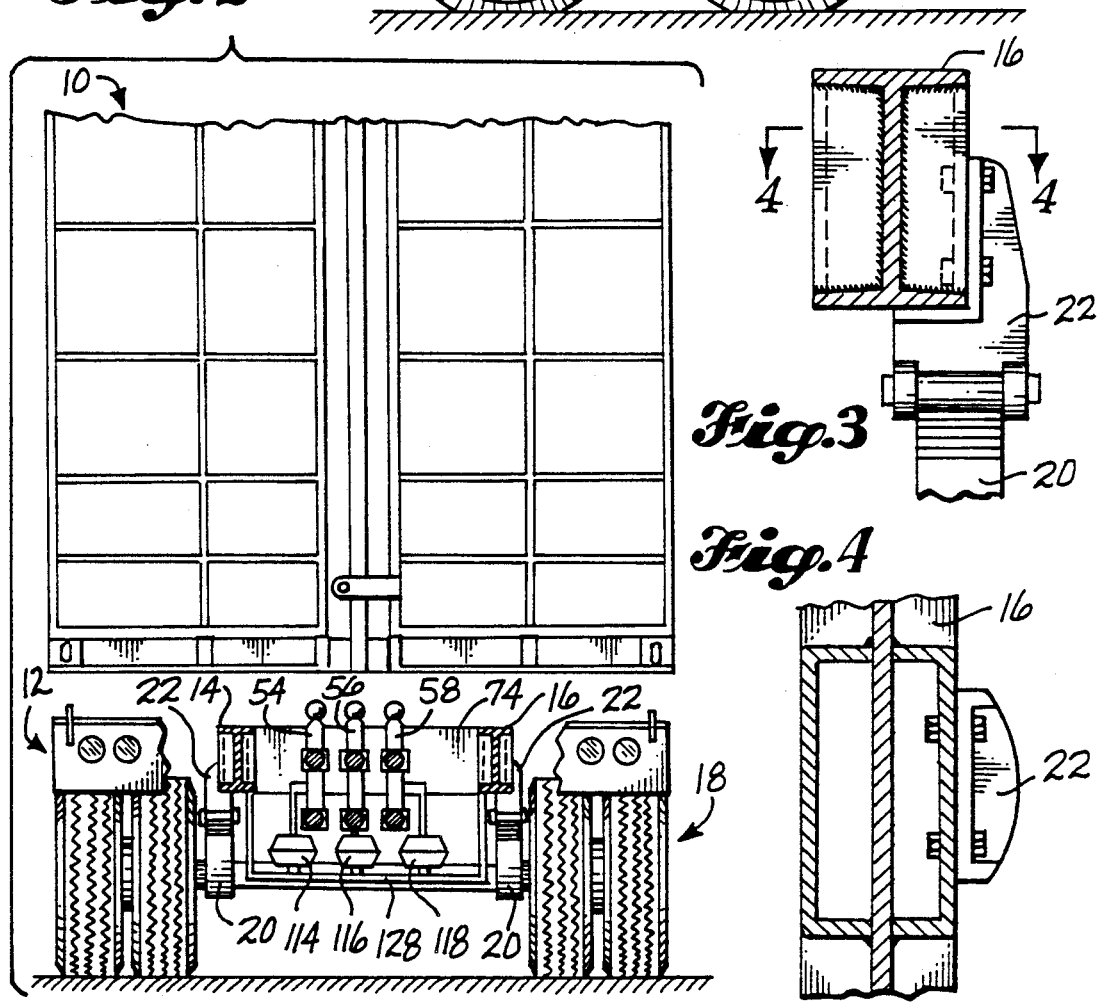
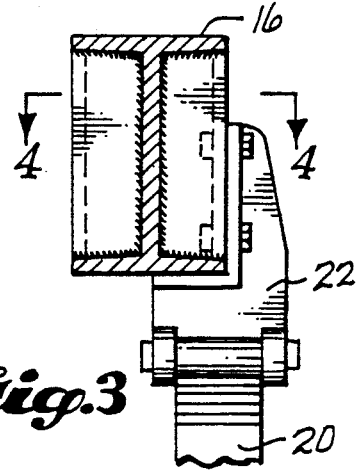
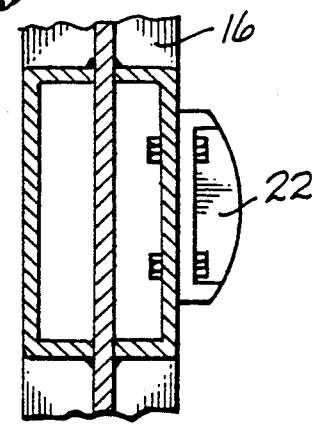

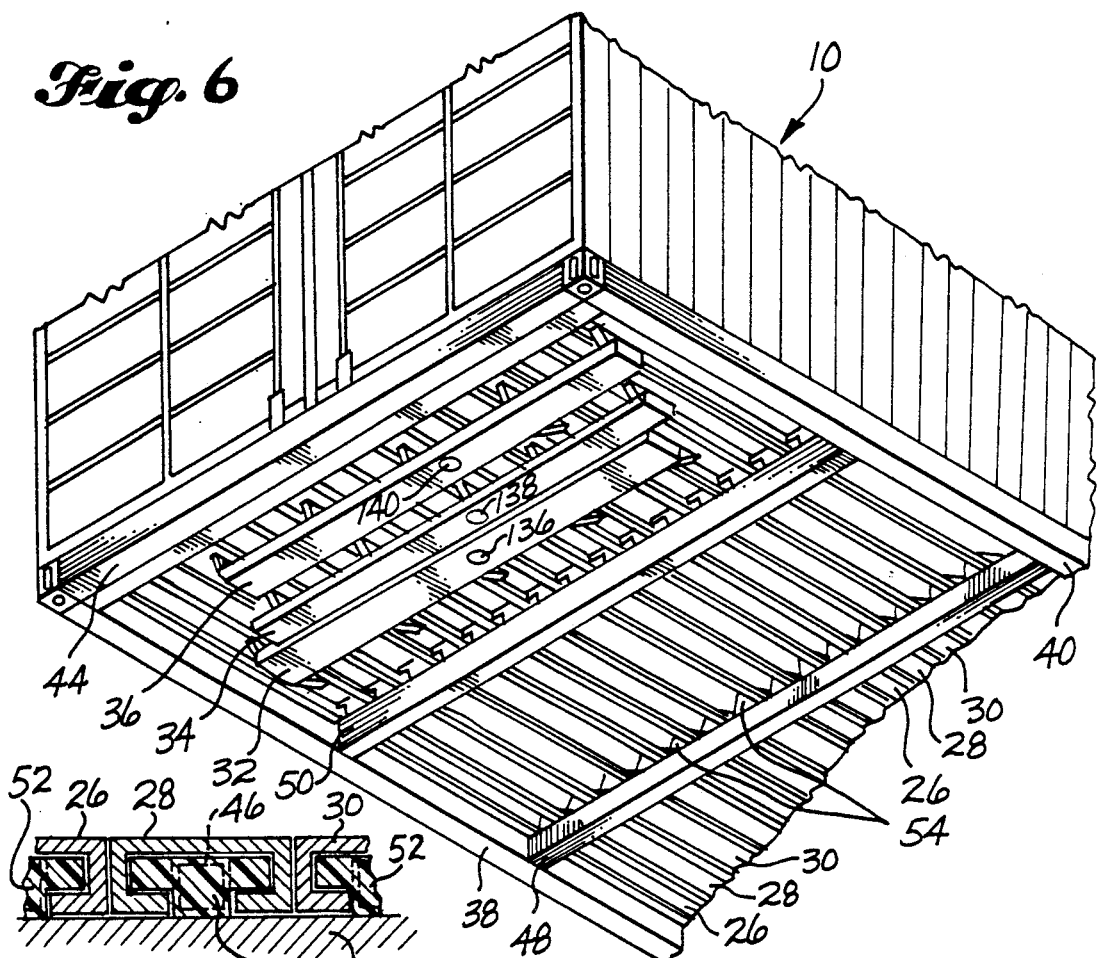
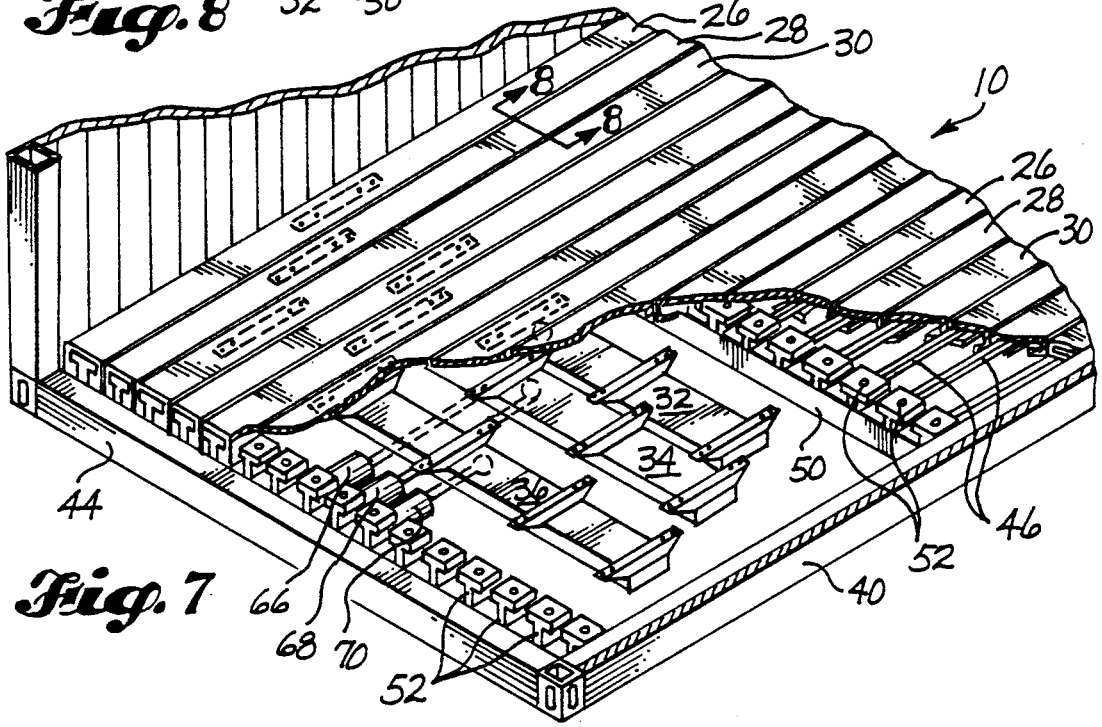

RECIPROCATING FLOOR CONVEYOR HAVING SEPARABLE FLOOR UNIT AND DRIVE UNIT

TECHNICAL FIELD

This invention relates to reciprocating floor conveyors, and particularly to such a conveyor in which a floor portion is separable from its power drive unit.

BACKGROUND ART

Vehicular and fixed installations of reciprocating floor conveyors are well known and have been in use for many years. Typically, these conveyors comprise a plurality of side-by-side elongated floor members which are longitudinally reciprocated in sets by a power drive unit. At least a majority of the floor members are advanced together in one direction to move a load and then less than a majority are retracted separately to a start position. The sequence is repeated, advancing the load when the majority of floor members advance and not substantially moving the load when the minority are retracted. It is well known to use such reciprocating floor conveyors to move or unload either bulk or palleted loads.

The use of standardized containers has become commonplace in the shipping industry for transporting goods by ship, truck and/or railway without unloading the shipped goods from the container at intermediate points. A typical journey of such a cargo container may include loading goods into the container which is then carried by truck or railway to a seaport where the container is stacked, along with many others, onto an ocean-going vessel. The container may be transported across the ocean to another seaport where it is loaded onto a railcar frame and carried to a central distribution station. At the distribution station, the container may be moved onto a truck or trailer frame for local delivery to its final destination. After delivery, the empty container may be returned by truck and/or railway to a seaport for return shipment, unloaded or loaded with cargo.

Many times a cargo container will spend a portion or all of its return journey unloaded because of its inability to carry or handle certain types of loads. Outfitting a cargo container with a reciprocating floor conveyor would increase the utility of the container by making it able to handle most any type of load, whether bulk, palleted, refrigerated or dry. Outfitting a cargo container with a complete reciprocating floor conveyor, including the necessary power drive unit, would add significant tare weight to the container, unnecessarily increasing the cost of transporting the container and its cargo between intermediate destinations where loading and unloading functions are not performed. Furthermore, any equipment added to the cargo container or transport vehicle frames which make either of them non-uniform in size or which limits their interchangeable use with standard containers or transport vehicle frames is considered extremely undesirable.

SUMMARY OF THE INVENTION

The present invention provides a power drive unit and floor unit for a reciprocating floor conveyor which are conveniently separable from one another.

The power drive unit reciprocates a floor conveyor made up of at least three sets of longitudinally reciprocatable floor members and which has a transverse drive beam connected to each set of floor members. The power drive unit includes a plurality of drive legs, one for each set of floor members, and each drive leg is connectable to a separate transverse drive beam to reciprocatably drive it and its set of floor members. Each drive leg is mounted to swing forwardly and rearwardly about a pivot point. A separate drive motor is connected to each of the drive legs to swing the drive legs, in turn, moving the drive beams and the respective connected floor members. Each motor operates to pivot its leg about its pivot point between start and advanced positions. The drive motors operate in sequence to move at least a majority of the drive legs together in one direction and to subsequently return each drive leg separately in the opposite direction. This power drive unit may be installed at a fixed location or as part of a transporting vehicle for carrying cargo containers equipped with reciprocatable floor members.

The invention also includes a cargo container which may be carried by a transporting vehicle with a power drive. The container includes a bottom frame having a lower boundary and at least three sets of elongated reciprocatable floor members. Each floor member is supported on the bottom frame for independent longitudinal reciprocation between start and advanced positions. A separate one of a plurality of transverse drive beams below the floor members is connected to each set of floor members. Each transverse drive beam has a lower boundary positioned no lower than the lower boundary of the bottom frame. The transverse drive beams are detachably connectable to the power drive carried by the transporting vehicle, so that the power drive can longitudinally reciprocate the floor members.

An object of this invention is to provide a cargo container and transporting vehicle which, when connected together, provide a reciprocating floor conveyor and which, when separated, may be interchangeably used with other containers and/or transport vehicles which may or may not include the other cooperating component of a reciprocating floor conveyor. The cargo container may be stacked or transported with other cargo containers that may or may not include reciprocatable floor members. The transporting vehicle may also be used for carrying cargo containers without reciprocatable floor members.

According to one aspect of the invention, the drive legs of the power drive unit may be retracted so as not to interfere with carrying any standard cargo container. The reciprocatable floor members and power drive unit do not add unacceptable tare weight to either the container or transport vehicle. Furthermore, there is no separate component which must be tracked and accounted for by the carrier. The containers and transport vehicles are tracked by the normal procedures which account for the location of other cargo containers and transport vehicles.

Other aspects and features of this invention will become apparent upon inspection of the various figures of the drawing, the detailed description of the best mode for carrying out the invention, and the appended claims.

BRIEF DESCRIPTION OF THE DRAWINGS

Like reference numerals are used to identify like parts throughout the various figures of the drawing, in which:

FIG. 1 is a fragmentary side view of the preferred embodiment of the invention showing a cargo container elevated slightly above a vehicle frame;

FIG. 2 is a fragmentary rear view showing a cargo container slightly elevated above a partially cut away vehicle frame;

FIG. 3 is a cross-sectional view of the undercarriage attachment to the vehicle frame taken substantially along line 3—3 of FIG. 1;

FIG. 4 is a cross-sectional view of the undercarriage attachment to the vehicle frame taken substantially along line 4—4 of FIG. 3;

FIG. 6 is a fragmentary pictorial view of the underside of the cargo container;

FIG. 7 is a fragmentary pictorial view of the floor and frame of the cargo container having a portion of the floor cut away;

FIG. 8 is a cross-sectional view of floor members and 5 support frame taken substantially along line 8—8 of FIG. 7;

BEST MODE FOR CARRYING OUT THE INVENTION

Figure 5:
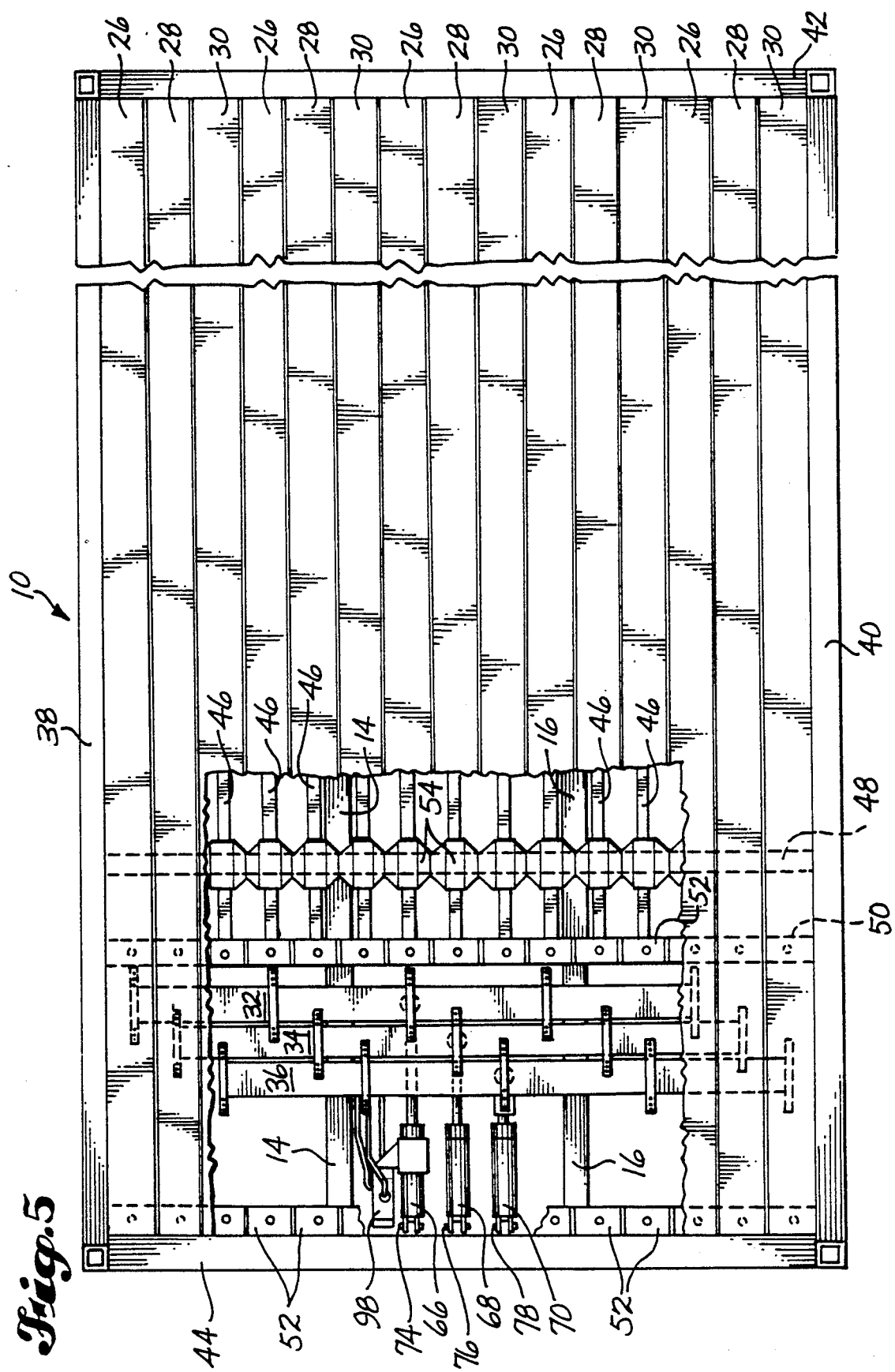
FIG. 5 is a partially cut away top plan view of a reciprocating floor conveyor according to the preferred embodiment of the invention installed in a cargo container and mounted on a vehicle frame having a power drive according to the preferred embodiment of the invention.

My U.S. Pat. No. 4,492,303, issued Jan. 8, 1985, and entitled, "Drive/Guide System for a Reciprocating Floor Conveyor," and my U.S. Pat. No. 4,821,868, issued Apr. 18, 1989, and entitled, "Drive/Frame Assembly for a Reciprocating Floor," disclose preferred embodiments of a support and guide frame construction for floor members and reciprocating floor conveyor construction in which the reciprocating floor and power drive unit are integral with one another. The contents of U.S. Pat. No. 4,492,303 and U.S. Pat. No. 4,821,868 are hereby expressly incorporated into this application by this specific reference.

As disclosed in the above-referenced patents, a reciprocating floor conveyor operates generally by at least a majority of the floor members being moved in one direction to advance a load, and being separately retracted in the opposite direction. Each of the above patents discloses a reciprocating floor conveyor in which the floor members are divided into three sets. All of the floor members are moved in the first direction to advance the load. They are retracted one set at a time until all floor members are at a start position. The operation is then repeated. These features of a reciprocating floor conveyor are well known. The present invention provides a reciprocating floor conveyor in which a floor unit and power drive unit are easily separable.

Referring to the several figures of the drawing, and first to FIGS. 1 and 2, therein is shown at 10 a portion of a standardized cargo shipping container equipped with a floor made of separately reciprocatable floor members mounted on a lower frame. The cargo container 10 is shown separated a short distance above a transporting vehicle 12 which is equipped with a power drive unit 24 for operably engaging and reciprocating the floor members of the cargo container 10. The transporting vehicle 12 may be either a trailer which is pulled by a separate tractor, or a truck having a flat bed or an open frame for supporting a cargo container 10 thereon.

Generally, the transporting vehicle 12 includes a pair of elongated frame members 14, 16 mounted on an undercarriage 18 with single or tandem axles. Referring now also to FIGS. 3 and 4, typical suspension springs 20 are attached by flange members 22 to the elongated frame members 14, 16 in a well known manner. The embodiment illustrated in FIG. 1 shows the undercarriage 18 mounted forwardly of the power drive unit 22 which facilitates a clearer view of the power drive unit structure discussed herein. It should be noted, however, that it is a feature of the present invention that the power drive unit 24 will not conflict with any normal placement of the undercarriage 18 along the length of the transporting vehicle 12. In order to appropriately distribute the weight of the load, the undercarriage 18 may be mounted at a rearwardmost position or, as illustrated, at a slightly forward position. In some cases, the undercarriage 18 is slidably positionable along a longitudinal region of the frame members 14, 16 in order to allow the transporting vehicle 12 to carry a variety of loads.

Referring now to FIG. 5, therein is shown a top plan view of a cargo container with a floor made according to the preferred embodiment of the invention. The floor is made up of three sets of elongated, separately reciprocatable floor members 26, 28, 30. The first set of floor members 26 is attached to a first transverse drive beam 32. The second set of floor members 28 is attached to a second transverse drive beam 34. The third set of floor members 30 is attached to a third transverse drive beam 36. A bottom frame having opposite side members 38, 40, a front member 42 and a rear member 44 defines the outer perimeter and lower edge of the container 10.

Referring now simultaneously to FIGS. 5, 6 and 7, the floor members 26, 28, 30 are shown to be supported on longitudinal guide beams 46 which are mounted on a plurality of transverse support beams, one of which is shown at 48. Forwardly and rearwardly of the transverse drive beams 32, 34, 36, the floor members 26, 28, 30 are supported on a forward support beam 50 and the rear frame member 44. Guide/bearing blocks 52, being generally T-shaped in cross-section, are mounted to the upper side of the support beam 50 and rear frame member 44. In preferred form, the guide/bearing blocks 52 are made of a self-lubricating material such as nylon or Teflon and are shaped to provide an upper bearing surface on which the floor members 26, 28, 30 will slide for longitudinal reciprocation. Plastic bearing members 54 are attached to the longitudinal guide beams 46 at the location of each of the transverse support beams 48. My U.S. Pat. No. 4,679,686, issued July 14, 1987, and entitled, "Bearing System for Reciprocating Floor Conveyor," discloses plastic slide bearings which are constructed to be snapped into place on the longitudinal guide beams 46 and which are constructed to allow the floor members 26, 28, 30 to be snapped into place from above. The contents of U.S. Pat. No. 4,679,686 is hereby expressly incorporated into this application by this specific reference.

The attachment of the transverse drive beams 32, 34, 36 to their respective sets of floor members 26, 28, 30 allows each set of floor members to be longitudinally reciprocated as a unit together with, or separate from, the other sets of floor members. The transverse drive beams 32, 34, 36 are positioned such that they are between side frame members 38, 40 and do not protrude downwardly below the lower boundary of the container's bottom frame (38, 40, 42, 44). In this manner, the container 10 may be transported on a standard transport vehicle whether or not the vehicle is equipped with a power drive unit 24. The container 10 may also be handled and stacked normally with other cargo containers, whether or not the other containers are similarly equipped with reciprocatable floor members. The floor members 26, 28, 30, longitudinal guide beams 46, transverse support beams 48, 50 and transverse drive beams 32, 34, 36 may be made of either aluminum, steel, or similar material as desired, and do not add significant tare weight to the cargo container 10.

Figure 9:
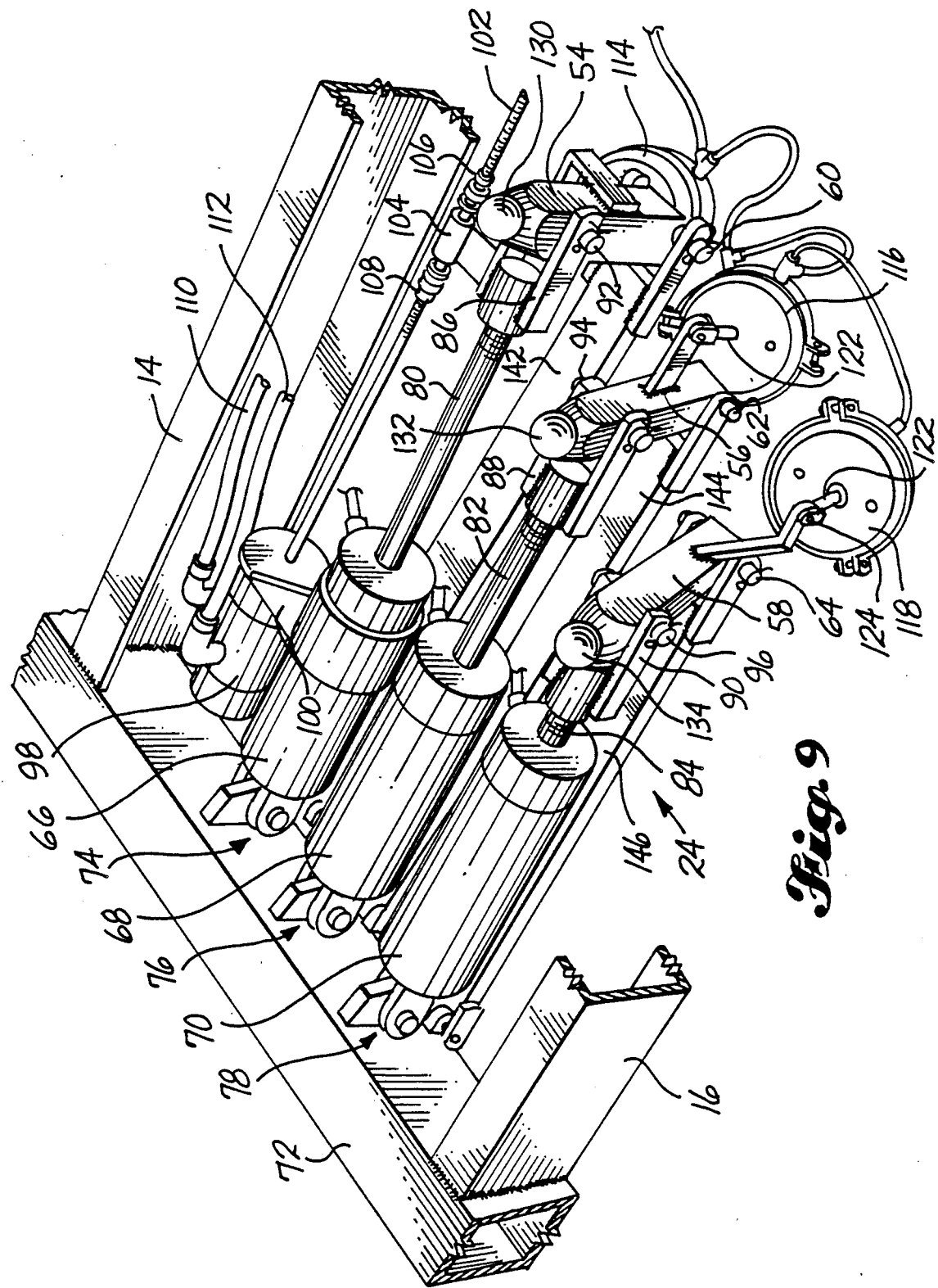
FIG. 9 is a fragmentary pictorial view of a power drive unit according to the preferred embodiment of the invention.
Figure 10:
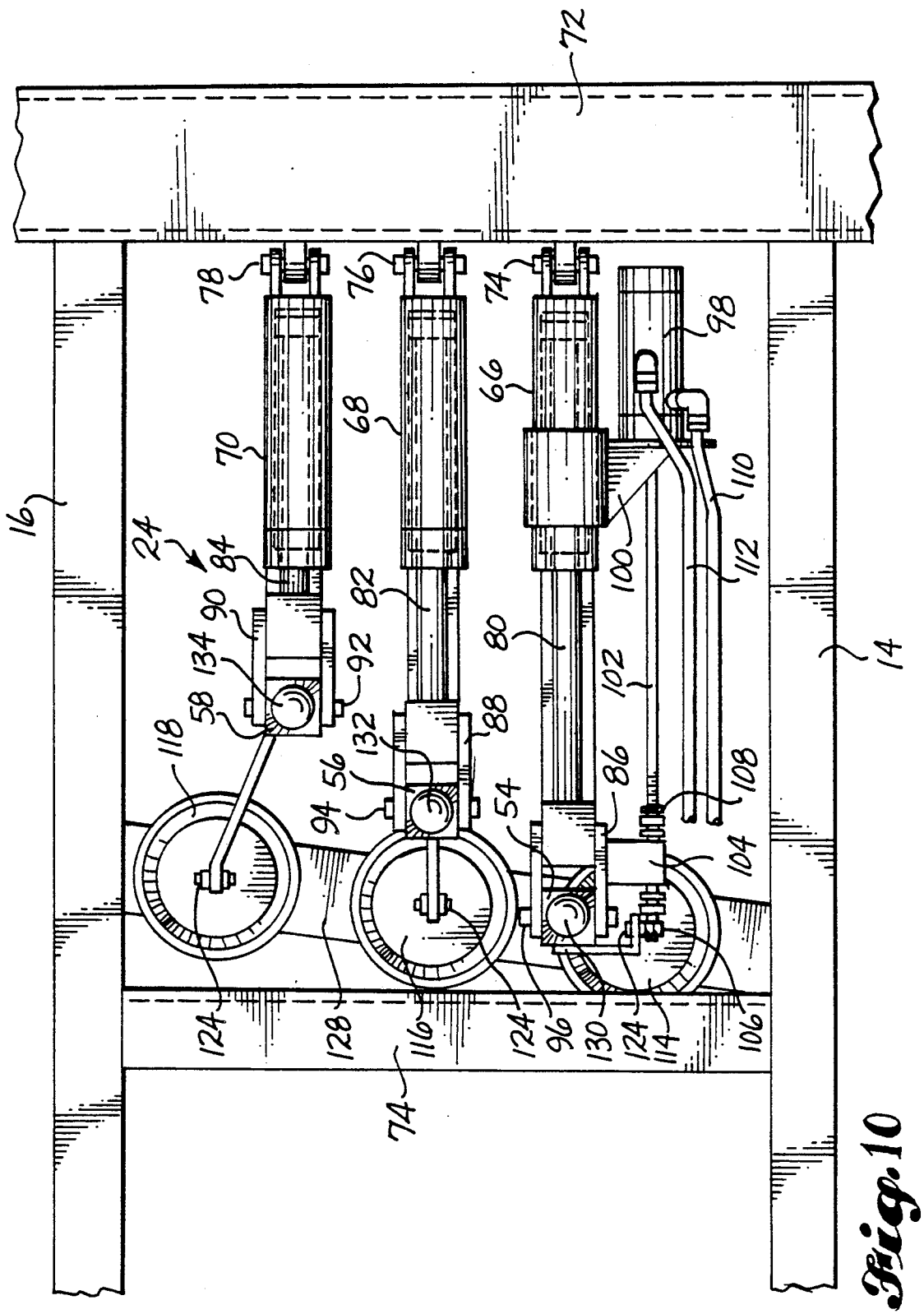
FIG. 10 is a fragmentary top plan view of the power drive unit shown in FIG. 9.

Referring now to FIGS. 9 and 10, along with FIGS. 1 and 2, therein is shown a power drive unit 24 according to the preferred embodiment of the invention. Generally, the power drive unit 24 includes a plurality of drive legs 54, 56, 58, one being associated with each set of floor members 26, 28, 30 and respective transverse drive beam 32, 34, 36 of the reciprocatable floor unit. Each drive leg 54, 56, 58 is mounted to swing forwardly and rearwardly on a pivot pin 69, 62, 64 and is operated by a separate linear hydraulic motor 66, 68, 70. The hydraulic motors 66, 68, 70 lie longitudinally between crossmembers 72, 74 and substantially parallel to and between the frame members 14, 16. In preferred form, each drive motor 66, 68, 70 is pivotally attached by a clevis and pivot pin 74, 76, 78 to the rearwardmost cross member 72. Forwardly extending from each linear hydraulic motor 66, 68, 70 is a piston rod 80, 82, 84 which is pivotally attached at its outward end by a clevis 86, 88, 90 and pin 92, 94, 96 to its respective drive leg 54, 56, 58.

In operation, each linear hydraulic motor 66, 68, 70 simultaneously advances to swing their respective drive legs 54, 56, 58 in one direction to an advanced position, and then to separately retract each drive leg 54, 56, 58 in the opposite direction to the start position. In turn, each drive leg 54, 56, 58 is detachably engageable with a respective transverse drive beam 32, 34, 36 of a reciprocatable floor unit to transfer reciprocating movement to the drive beams 32, 34, 36 and their respective sets of floor members 26, 28, 30. In preferred form, this detachable connection is made by a ball-and-socket joint which will be discussed further below.

Referring now to FIGS. 9 and 10, therein is shown at 98 a combined pilot valve and directional valve attached by flange 100 to the first hydraulic cylinder 66. An actuator rod 102 extends from the valve 98 substantially parallel to the piston rod 80. The actuation rod 102 slidably extends through a flange member 104 laterally extending from the piston rod 80 or clevis 86. Spaced-apart stop members 106, 108 on the actuation rod 102 provide a "lost motion" connection between the flange member 104 and actuation rod 102. The lost motion connection allows the piston rod 80 to move the actuation rod 102 only a short distance relative to the full stroke of the piston rod 80 as the piston rod 80 approaches the extreme ends of its stroke. In this manner, the pilot valve and, in turn, the directional valve, is switched as the first hydraulic motor 66 reaches its start position. In this condition, hydraulic fluid flows through supply lines 110, 112 to cause all of the hydraulic motors 66, 68, 70 to advance together in one direction toward an advanced position.

As the first piston rod 80 reaches its advanced position, the pilot valve and, in turn, directional valve is switched by movement of the actuation rod 102. Flow of hydraulic fluid through the lines 110, 112 is reversed causing each of the linear hydraulic motors 66, 68, 70 to individually and successively retract to their start position. An example of a system of a pilot valves and directional valves for synchronizing movement of hydraulic motors for a reciprocating floor conveyor system is disclosed in detail in my U.S. Pat. No. 4,580,678, the contents of which is hereby expressly incorporated into this application by this specific reference.

Figure 11:
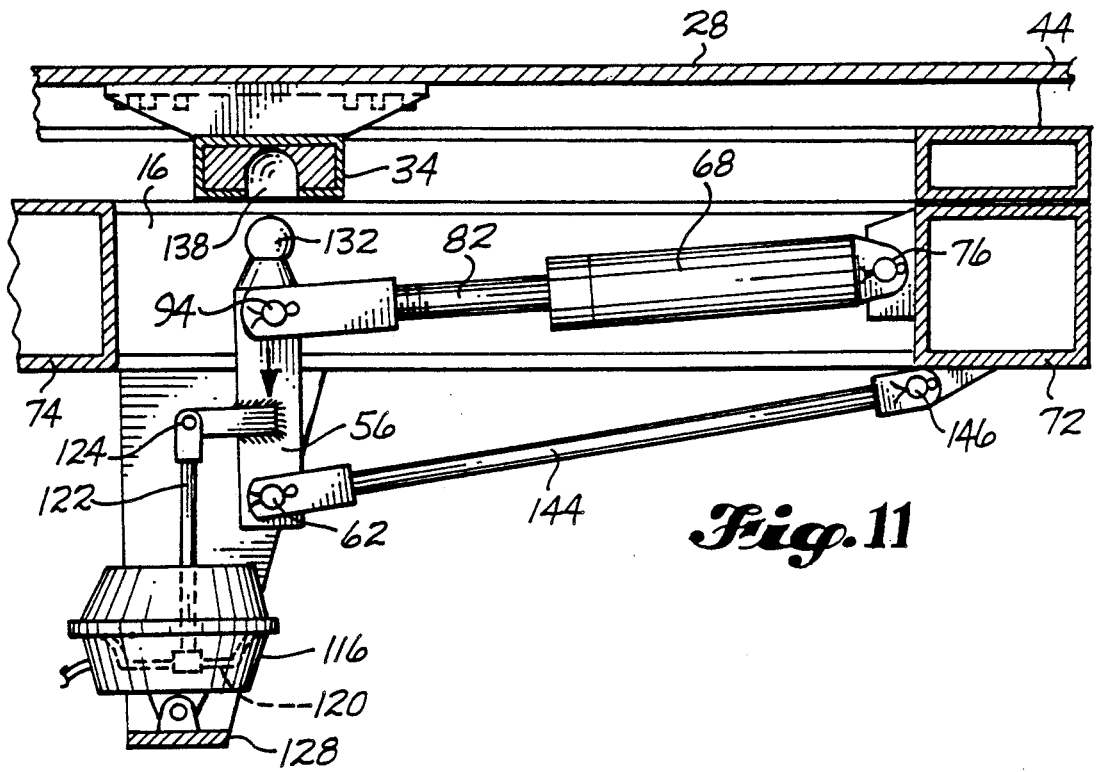
FIG. 11 is a side view of a drive cylinder and drive leg in a lowered, disengaged position.
Figure 12:
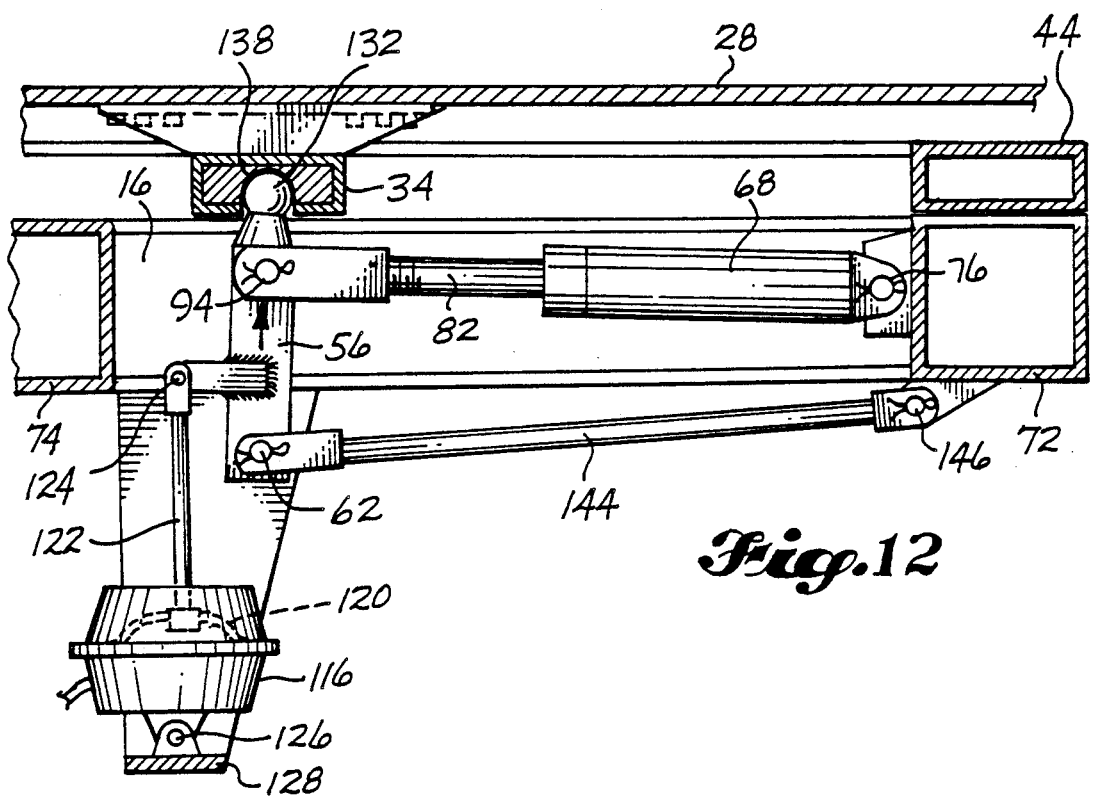
FIG. 12 is a side view similar to FIG. 11, showing the drive cylinder and drive leg in a raised, engaged position.

According to one important aspect of the invention, the power drive unit 24 is positioned in the transport vehicle 12 such that it does not interfere with loading and unloading of cargo containers 10, whether or not such containers 10 are equipped with a reciprocatable floor unit. In order that the power drive unit 24 may be positioned below the upper boundary of the frame members 14, 16 and crossmembers 72, 74, as shown in FIG. 11, and that the drive legs 54, 56, 58 may be raised in position to engage the transverse drive beams 32, 34, 36, as shown in FIG. 12, pneumatic lift bellows 114, 116, 118 are provided. The pneumatic lifts 114, 116, 118 may be of any well-known construction. The presently-known best mode includes a flexible diaphragm 120 which may be moved by air pressure applied to one cavity of the pneumatic lift 116 to, in turn, move an actuator arm 122 which is pivotally connected 124 to a drive leg 54, 56, 58. In practice, because of the independent movement of each drive leg 54, 56, 58, it is preferred that a separate pneumatic lift 114, 116, 118 be provided for each drive leg 54, 56, 58. However, other means for positioning the drive legs 54, 56, 58, whether unitary or separate, may be used as desired. In the preferred, illustrated embodiment, each pneumatic lift 114, 116, 118 is independently pivotally mounted 126 to a dropped crossmember 128 which extends between frame members 14, 16.

The drive legs 54, 56, 58 of the power drive unit 24 may be designed to engage with the transverse drive beams 32, 34, 36 of the reciprocatable floor unit in any desired manner which allows forward and rearward pivotal movement of the drive legs 54, 56, 58 and transfers linear reciprocating motion to the drive beams 32, 34, 36. Ideally, this engagement should be achieved without significant effort or manipulation on the part of the operator. It is preferred that this engagement may be completed merely by the upward movement of each drive leg 54, 56, 58 relative to its respective transverse drive beam 32, 34, 36.

In the preferred form, each leg 54, 56, 58 is provided at its upper end with a ball portion 130, 132, 134 which is shaped to be received within a socket 136, 138, 140 in each transverse drive beam 32, 34, 36. After the container 10 is positioned on the vehicle frame 12, each drive leg 54, 56, 58 is moved, as necessary, by the hydraulic motors 66, 68, 70 to position each ball 130, 132, 134 substantially directly beneath each respective socket 136, 138, 140. Air pressure is then applied to each pneumatic lift 114, 116, 118 to lift the drive legs 54, 56, 58 upwardly into engagement with the respective sockets 136, 138, 140. In preferred form, air pressure is maintained on the pneumatic lifts 114, 116, 118 to maintain the engagement of the ball portions 130, 132, 134 in the sockets 136, 138, 140. If desired, the sockets 136, 138, 140 may be provided with a holding or detent means, such as at the periphery of the socket to maintain the engagement of the ball portion 130, 132, 134 within the socket 136, 138, 140 without the applied pressure from the pneumatic lifts 114, 116, 118.

Because the transverse drive beams 32, 34, 36 and their respective sets of floor members 26, 28, 30 must be reciprocated along a single plane, the arcuate movement of the drive legs 54, 56, 58 about pivot points 60, 62, 64 must be compensated. In preferred form, this is done through the use of a "four-bar linkage" which allows the lower pivot point 60, 62, 64 of each drive leg 54, 56, 58 to "float" upwardly and downwardly relative to the pivotal ball-and-socket engagement of each drive leg 54, 56, 58 and transverse drive beam 32, 34, 36.

Figure 13:
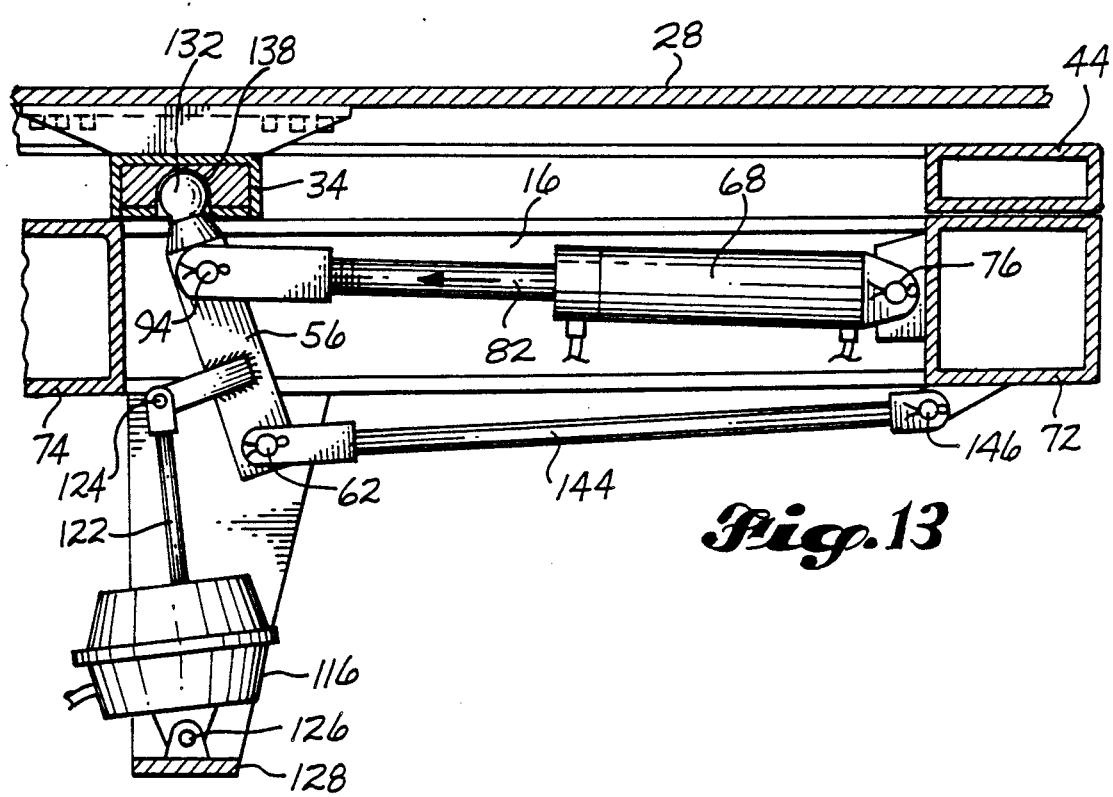
FIG. 13 is a side view of a drive leg and drive cylinder in the engaged, forwardmost position.
Figure 14:
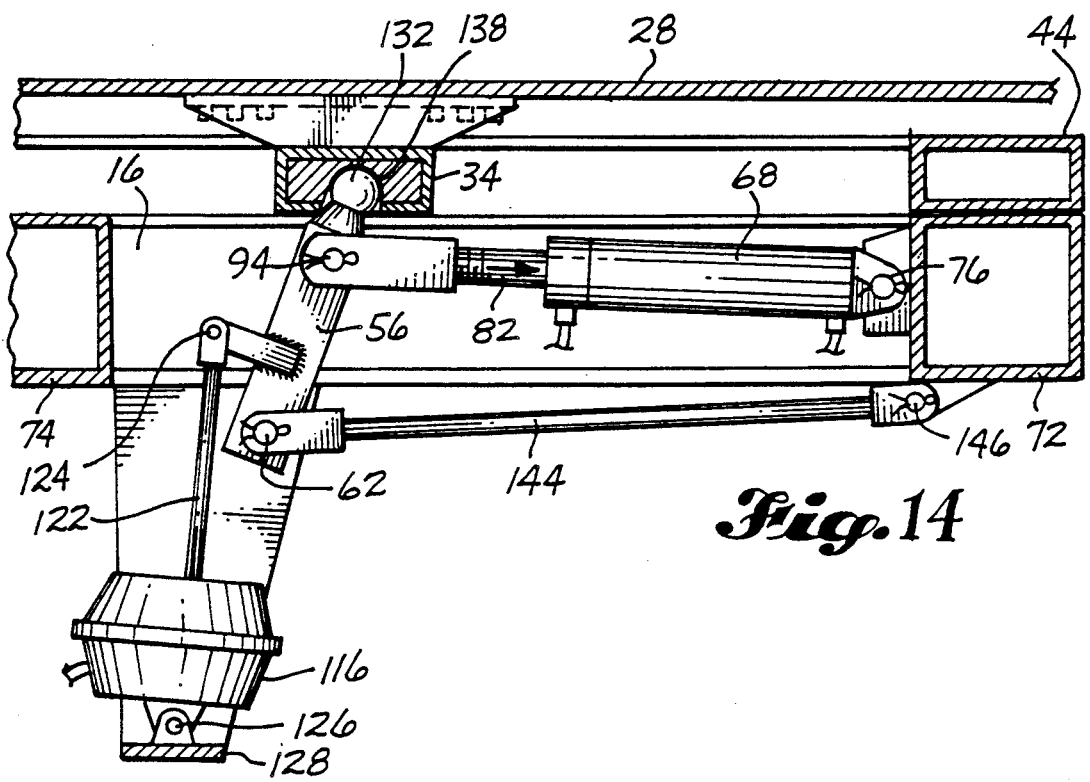
FIG. 14 is a side view similar to FIG. 13, showing the drive leg and drive cylinder in the rearwardmost engaged position.

Referring to FIGS. 12, 13 and 14, therein is shown, as an example, a side plan view of the second linear hydraulic drive motor 68 and its associated drive leg 56 in various stages of operational movement. The "four-bar linkage" includes the linear hydraulic drive motor 68 and its associated piston rod 82 which are pivotally linked 76, 94 at opposite ends to the rearward crossmember 72 and the drive leg 56. Substantially directly below each hydraulic drive motor is a support bar 142, 144, 146. As illustrated, the support bar 144 is pivotally connected 62, 146 at opposite ends to the rearward crossmember 72 and a lower of the drive leg 56. The support bar 144 is of a fixed length and pivot points 76 and 146 are at a fixed distance from one another on the rear crossmember 172. The pivotal connections 62, 94 and pivot ball 132 on the drive leg 56 are at a fixed distance from one another.

In operation, the linear hydraulic motor 68 operates to forwardly extend and rearwardly retract its piston rod 82, thereby swinging the drive leg 56 forwardly and rearwardly about its lower pivot point 62. Because of the pivotal linkage of the support bar 144, the lower pivot point 62 of the drive leg 56 is permitted to "float" upwardly and downwardly relative to the ball-and-socket pivot. The pneumatic lift 116 operates to bias the drive leg 56 upwardly into engagement with the transverse drive beam 34. The pneumatic lift, however, provides sufficient elasticity to compensate for the drive leg's 56 upward and downward "float" as it is swung forwardly and rearwardly about its moving pivot point 62. The pivot point 62 is always equidistant from the ball-and-socket 132, 138 connection at the opposite end of the drive leg 56. However, the vertical aspect of the pivot point's spacing from the ball-and-socket's (and transverse drive beam's) horizontal plane of travel changes along the arcuate stroke of the drive leg 56 between its forwardmost (FIG. 13), intermediate (FIG. 12), and rearwardmost (FIG. 14) positions.

It is to be understood that the illustrated and above-described embodiment of a power drive unit and reciprocatable floor unit are examples only of the currently best-known mode of operation and, therefore, are non-limitive. Many variations in form and structure may be made without departing from the spirit and scope of the invention. For example, rotating hydraulic motors could be substituted for the disclosed linear hydraulic motors for forwardly and rearwardly swinging the drive legs. The spacing of pivot points or placement of members could be changed in order to maximize power or length of stroke, as desired. These are but a few of the endless variations which could be made to my invention to accommodate particular applications. Therefore, my patent protection is not to be limited by any of the illustrated or above-described embodiments, but rather by the following claim or claims as interpreted according to accepted doctrines of claim interpretation, including the doctrine of equivalents.

What is claimed is:

1. A power drive unit for a reciprocating floor conveyor made up of at least three sets of longitudinally reciprocatable floor members and a transverse drive beam for each set of floor members, each of which is connected to its set of floor members, said power drive unit comprising:

a plurality of drive legs, one for each said set of floor members and each drive leg being pivotally connectable to a separate transverse drive beam to reciprocatably drive it and its set of said floor members, each said drive leg being mounted to swing forwardly and rearwardly about a pivot point;

a plurality of drive motors, one for each drive leg, each said drive motor operably connected to a separate one of said drive legs at locations offset from the pivot points about which said legs pivot, to swing the drive legs to, in turn, move the drive beams and the respective connected floor members, each motor operable to pivot its said leg about its said pivot point between start and advanced positions; and said drive motors operating in sequence to move at least a majority of said drive legs together in one direction and to subsequently return each drive leg separately in the opposite direction.

2. The power drive unit of claim 1, wherein said drive motors are linear hydraulic motors, each having a first end operably attached to a separate drive leg and a second end attached to a support frame, and further including a brace leg member for each drive leg, each brace leg member having a first end pivotally attached to a drive leg at said drive leg's pivot point and a second end attached to said support frame, such that said transverse drive beams and floor members each may be moved in a single plane and said drive leg's pivot point is movable relative to said plane as each said drive leg swings forwardly and rearwardly between said start and advanced positions.

3. The power drive unit of claim 2, wherein each said drive leg is detachably pivotally engaged with a transverse drive beam, said engagement including a ball-and-socket joint and said drive legs being biased into a position of said engagement.

4. The power drive unit of claim 3, wherein each said drive leg is biased by a pneumatic lift.

5. The power drive unit of claim 1, wherein each said drive leg is detachably pivotally connectable to said separate transverse drive beam, said legs being movable between connected and unconnected positions.

6. The power drive unit of claim 5, wherein said legs are moved between said connected and unconnected positions by a pneumatic lift.

7. The power drive unit of claim 1, including means for automatically switching said drive motors according to said sequence between movement of said at least a majority of said drive legs together in one direction and said subsequent return of each drive leg separately in the opposite direction.

8. A reciprocating floor conveyor having a separable floor unit and drive unit, comprising:
- a floor unit, including:
- a bottom frame;
- at least three sets of elongated reciprocatable floor members, each supported on the bottom frame for independent longitudinal reciprocation in a single plane between start and advanced positions;
- a plurality of transverse drive beams below the floor members, one for each set o floor members and each being connected to its set of floor members; and
- a power drive unit, including:
- a support frame;
- a plurality of drive legs, one for each said set of floor members and each drive leg being pivotally connectable to a separate transverse drive beam to reciprocatably drive it and its set of said floor members, each said drive leg being mounted to swing forwardly and rearwardly about a pivot point;
- a plurality of drive motors, one for each drive leg, each said drive motor operably connected to a separate one of said drive legs at locations offset from the pivot points about which said legs pivot, to swing the drive legs to, in turn, move the drive beams and the respective connected floor members, each motor operable to pivot its said drive leg about its said pivot point between start and advanced positions; and
- said drive motors each operating in sequence to move a majority of said drive legs together in one direction and to subsequently return its drive leg separately in the opposite direction.

9. The reciprocating floor conveyor of claim 8, wherein said detachable connection between each said transverse drive beam and each said drive leg includes a ball-and-socket joint.

10. The reciprocating floor conveyor of claim 8, wherein said bottom frame includes a plurality of transverse frame members below said floor members and a plurality of longitudinal guide beams mounted on said transverse frame members, said longitudinal guide beams including bearing means on which said floor members are mounted for longitudinal reciprocation.

11. The reciprocating floor conveyor of claim 8, wherein said drive motors are linear hydraulic motors, each having a first end operably attached to a separate drive leg and a second end attached to said support frame, and further including a brace leg member for each drive leg, each brace leg member having a first end pivotally attached to a drive leg at said drive leg's pivot point and a second end attached to said support frame, such that said transverse drive beams and floor members each may be moved in a single plane and said drive leg's pivot point is movable relative to said plane as each drive leg swings forwardly and rearwardly between said start and advanced positions.

12. The reciprocating floor conveyor of claim 11, wherein each said drive leg is detachably pivotally engageable with a transverse drive beam, said engagement including a ball-and-socket joint and said drive legs being biased into a position of said engagement.

13. The reciprocating floor conveyor of claim 12, wherein each said drive leg is biased by a pneumatic lift.

14. The reciprocating floor conveyor of claim 8, wherein each said drive leg is detachably pivotally connectable to a separate transverse drive beam, said legs being movable between connected and unconnected positions.

15. The reciprocating floor conveyor of claim 14, wherein said legs are moved between said connected and unconnected positions by a pneumatic lift.

* * * * *

UNITED STATES PATENT AND TRADEMARK OFFICE
CERTIFICATE OF CORRECTION

PATENT NO. : 5,000,647
DATED : March 19, 1991
INVENTOR(S) : R. Keith Foster It is certified that error appears in the above-identified patent and that said Letters Patent is hereby corrected as shown below:

Col. 3, line 22, delete the numeral "5".

Col. 5, line 33, "69, 62, 64" should be -- 60, 62, 64 --.

Claim 8, col. 9, line 12, "o" should be -- of --.

Signed and Sealed this

Twenty-ninth Day of December, 1992

*Attest:*

DOUGLAS B. COMER

*Attesting Officer*   *Acting Commissioner of Patents and Trademarks*